United States Patent
Toan et al.

(10) Patent No.: US 6,472,550 B1
(45) Date of Patent: Oct. 29, 2002

(54) PROCESS FOR THE PREPARATION OF LOW CHLORIDE STABILIZERS

(75) Inventors: Vien Van Toan, Rheinfelden; Ronald Salathé, Magden, both of (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/702,932

(22) Filed: Oct. 31, 2000

(30) Foreign Application Priority Data

Nov. 2, 1999 (EP) .............................. 99810997

(51) Int. Cl.$^7$ .................................................. C07F 9/28
(52) U.S. Cl. ....................................................... 558/162
(58) Field of Search ......................................... 558/162

(56) References Cited

U.S. PATENT DOCUMENTS

| | | | |
|---|---|---|---|
| 4,075,163 A | | 2/1978 | Hofer et al. ............... 260/45.7 |
| 6,103,796 A | * | 8/2000 | Staneik et al. .............. 524/400 |

FOREIGN PATENT DOCUMENTS

EP           0633287       1/1995

OTHER PUBLICATIONS

The Merck Index, an Encyclopedia of Chemicals, Drugs, and Biologicals, 10$^{th}$ Ed., p. 611, No. 4162 and p. 722, No. 4857, 1983.

* cited by examiner

Primary Examiner—Floyd D. Higel
Assistant Examiner—Kamal Saeed
(74) Attorney, Agent, or Firm—Kevin T. Mansfield

(57) ABSTRACT

A process for the preparation of a stabilizer mixture containing a low amount of chloride comprising a) 50–80% by weight of tetrakis(2,4-di-tert-butylphenyl) biphenylene diphosphonite and its isomers, b) 5–25% by weight of bis(2,4-di-tert-butylphenyl) biphenylene monophosphonite and its isomers, and c) 5–25% by weight of a tris(2,4-di-tert-butylphenyl) phosphite, and where the sum of components (a), (b) and (c) is not greater than 100% by weight, by reacting biphenyl under Friedel-Crafts condition with phosphorus trichloride and aluminium trichloride and by reacting the product mixture with 2,4-di-tert-butyl-phenol in the presence of a tertiary amine or an aromatic amine and a solvent, separating the formed two layers, which process comprises treating the solvent layer with water, a base and a desiccant, separating the precipitate from the solution containing the stabilizer mixture and evaporating the solvent.

10 Claims, No Drawings

PROCESS FOR THE PREPARATION OF LOW CHLORIDE STABILIZERS

The present invention relates to a new work-up process for the preparation of a stabiliser mixture containing a low amount of chloride, which are suitable for stabilising organic materials against oxidative, thermal or light-induced degradation.

U.S. Pat. No. 4,075,163 discloses the synthesis of tetrakis (2,4-di-tert-butylphenyl)biphenylene diphosphonite (column 7, Table 1, compound 12) which is suitable for stabilising organic materials against oxidative, thermal or light-induced degradation. This compound is commercially available for example as Sandostab P-EPQ (RTM) from Clariant, Switzerland.

EP-A-0 633 287 discloses in Example 1 that this commercially available Sandostab P-EPQ (RTM) is a mixture of several components comprising a) 65% by weight of tetrakis (2,4-di-tert-butylphenyl)biphenylene diphosphonite, b) 15% by weight of bis(2,4-di-tert-butylphenyl)biphenylene monophosphonite, c) 13 parts by weight of tris(2,4-di-tert-butylphenyl) phosphite, d) 1.5 parts by weight of 2,4-di-tert-butyl phenol, e) up to 1% by weight of chloride [up to 10,000 mg/kg], f) up to 0.5% by weight of volatiles, and g) 4–5% by weight of the oxidised tetrakis(2,4-di-tert-butylphenyl)biphenylene diphosphonite.

Phosphites and phosphonites are hydrolytically very labile (see Example 29 in U.S. Pat. No. 4,075,163). Therefore, during the synthesis of Sandostab P-EPQ (RTM) the reaction mixture was never brought into contact with water. In the actual large scale production of Sandostab P-EPQ (RTM) the neutralisation of the remaining aluminium trichloride/pyridine/hydrochloric acid complex is done with gaseous ammonia (see comparative Example 2 in the instant application). However, some of the formed salts like for example ammonium chloride remain in the final product. These salt impurities may be the reason why the final stabiliser mixture is slightly turbid. A turbid stabiliser for polyolefins, however, induces some haze in polyolefins which is for some applications clearly undesired.

The goal of the instant invention was therefore to find an improved work-up process for the synthesis of Sandostab P-EPQ (RTM) containing a low amount of chloride and forming a product which is not turbid and does not induce any haze into synthetic polymers.

The present invention therefore relates to a process for the preparation of a stabiliser mixture containing a low amount of chloride comprising a) 50–80% by weight of a diphosphonite of the formula I

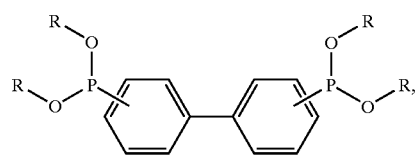

(I)

b) 5–25% by weight of a monophosphonite of the formula II

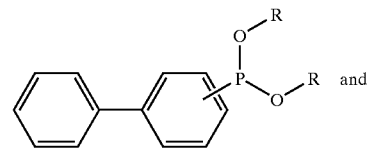

(II)

and c) 5–25% by weight of a phosphite of the formula III

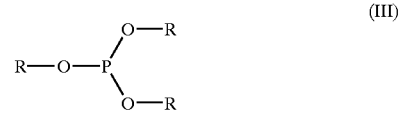

(III)

in which R is a radical of the formula IV

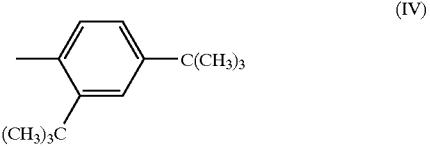

(IV)

and where the sum of the compounds of the formula I, II and III is not greater than 100% by weight, by reacting a biphenyl of the formula V

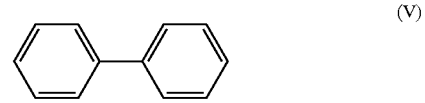

(V)

under Friedel-Crafts condition with phosphorus trichloride and aluminium trichloride and by reacting the product mixture with 2,4-di-tert-butyl-phenol of the formula VI

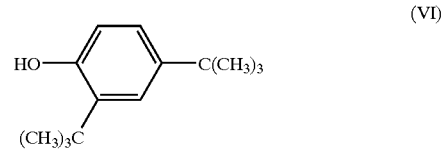

(VI)

in the presence of a tertiary amine or an aromatic amine and a solvent, separating the formed two layers, which process comprises treating the solvent layer with water, a base and a desiccant, separating the precipitate from the solution containing the stabiliser mixture and evaporating the solvent.

A preferred tertiary amine is a compound of the formula VII

(VII)

wherein $R_1$, $R_2$ and $R_3$ are the same or different, and are $C_1$–$C_{24}$alkyl; $C_4$–$C_{24}$alkyl interrupted by one or more O-atoms; phenyl, $C_7$–$C_9$phenylalkyl; $C_7$–$C_9$alkylphenyl; or two of $R_1$, $R_2$ and $R_3$ together with the N-atom to which they are attached form a 5-, 6- or 7-membered heterocyclic residue, which optionally contains further oxygen, nitrogen or sulphur atom and which is optionally substituted by one or more $C_1$–$C_4$alkyl groups, and the other of $R_1$, $R_2$ and $R_3$ is $C_1$–$C_{24}$alkyl or $C_4$–$C_{24}$alkyl interrupted by one or more O-atoms.

Alkyl having up to 24 carbon atoms is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3- dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, icosyl or docosyl. One of the preferred definitions for $R_1$, $R_2$ and $R_3$ is, for example, $C_2$–$C_{18}$alkyl. An especially preferred definition for $R_1$, $R_2$ and $R_3$ is $C_2$–$C_8$alkyl, for example ethyl.

$C_4$–$C_{24}$alkyl interrupted by one or more O-atoms include, e.g. 2-ethoxypropyl, 1-methoxypropyl, 1-methoxybutyl, n-butoxyethyl, 1-methoxyoctyl, 1-methoxydecyl, 1-methoxydodecyl, 1-methoxyhexadecyl, 1-methoxyeicosyl, 1-methoxytetraeicosyl and 2-methoxyethoxymethyl.

$C_7$–$C_9$Phenylalkyl is, for example, benzyl, α-methylbenzyl, α,α-dimethylbenzyl or 2-phenylethyl. Preference is given to benzyl.

Heterocyclic groups formed by two of $R_1$, $R_2$ and $R_3$ are preferably 6-membered, examples of which are piperidino, morpholino, thiomorpholino and 4-$C_1$–$C_4$alkyl-piperazino.

A preferred aromatic amine is pyridine which is optionally substituted by one or more $C_1$–$C_4$-alkyl groups.

Pyridine which is optionally substituted by one or more $C_1$–$C_4$alkyl group is, for example, 2,3-lutidine, 2,4-lutidine, 2,5-lutidine or 3,4-lutidine.

A preferred solvent is benzene which is optionally substituted by one or more chlorine or $C_1$–$C_4$alkyl groups.

Benzene which is optionally substituted by one or more chlorine or $C_1$–$C_4$alkyl groups is, for example, chlorobenzene, toluene or xylene. Preferred is chlorobenzene.

A preferred base is an alkaline metal- or an alkaline earth metal-hydroxide, oxide, hydrogen phosphate, dihydrogen phosphate, carbonate, hydrogen carbonate or tetraborate.

An alkaline metal- or alkaline earth metal-hydroxide, oxide, hydrogen phosphate, dihydrogen phosphate, carbonate, hydrogen carbonate or tetraborate is, for example, sodium hydroxide, potassium hydroxide, magnesium hydroxide, calcium hydroxide, barium hydroxide, calcium oxide, sodium hydrogen phosphate, sodium dihydrogen phosphate, sodium carbonate, calcium carbonate, sodium hydrogen carbonate or sodium tetraborate decahydrate.

Advantageously, the base is used in an amount of from 0.1 to 10% by weight, especially from 0.1 to 5% by weight, e.g. from 0.1 to 2% by weight, based on the weight of the solvent layer.

A preferred desiccant is an alkaline metal sulfate, an alkaline earth metal sulfate or oxide, a molecular sieve or aluminium oxide.

An alkaline metal sulfate, an alkaline earth metal sulfate or oxide, a molecular sieve or aluminium oxide is, for example, magnesium oxide, calcium oxide, sodium sulfate, magnesium sulfate, barium sulfate, molecular sieve 3 Å, molecular sieve 4 Å, powdered aluminium oxide, basic aluminium oxide, calcined aluminium oxide, fused aluminium oxide, fused aluminium oxide, granulated aluminium oxide or sintered aluminium oxide.

Advantageously, the dessicant is used in an amount of from 0.1 to 10% by weight, especially from 0.1 to 5% by weight, e.g. from 0.1 to 2% by weight, based on the weight of the solvent layer.

Some dessicants like for example sodium sulfate can also act as a cation precipitant.

Of interest is a process for the preparation of a stabiliser mixture containing a low amount of chloride, which comprises treating the solvent layer additionally with a filter-aid before separating the precipitate from the solution containing the stabiliser mixture.

A preferred filter-aid is, for example, fuller's earth [Merck Index $10^{th}$ Edition, 4162 (1983)] or infusorial earth [Merck Index $10^{th}$ Edition, 4857 (1983)] which includes floridin, a nonplastic variety of kaolin containing an aluminium magnesium silicate, kieselgur, celite, diatomaceous earth like for example Hyflo Super Cel [(RTM), Aldrich 39,254–5].

Advantageously, the filter-aid is used in an amount of from 0.1 to 10% by weight, especially from 0.1 to 5% by weight, e.g. from 0.1 to 2% by weight, based on the weight of the solvent layer.

Of special interest is a process for the preparation of a stabiliser mixture containing a low amount of chloride, which comprises that the water is added in the form of crystalline water which is present in the base.

A preferred base with crystalline water is, for example, sodium tetraborate decahydrate ($Na_2B_4O_7$ 10 $H_2O$), $Na_2HPO_4$ 12 $H_2O$ or $Na_2CO_3$ 10 $H_2O$.

Preferred is a process for the preparation of a stabiliser mixture containing a low amount of chloride, which comprises treating the solvent layer with water, a base and a desiccant at a temperature range of 0–25° C., for example 5–20° C.

Preferred is also a process for the preparation of a stabiliser mixture containing a low amount of chloride, which comprises treating the solvent layer with water, a base and a desiccant so that the pH range is of from 7.0 to 13, especially of from 7.5 to 12, e.g. of from 8 to 12.

Of special interest is a process for the preparation of a stabiliser mixture containing a low amount of chloride, which comprises treating the solvent layer with water in an amount of from 0.1 to 10% by weight, especially from 0.1 to 5% by weight, e.g. 0.1 to 2% by weight, based on the weight of the solvent layer.

Of special interest is also a process for the preparation of a stabiliser mixture in which the amount of chloride in the final product mixture is lower than 5,000 mg/kg, especially lower than 1500 mg/kg, e.g. lower than 500 mg/kg.

In the reaction of biphenyl of the formula V under Friedel-Crafts condition with phosphorus trichloride and aluminium trichloride, the phosphorus trichloride is preferably used as reagent and solvent. Thus, for the reaction of one mole biphenyl, 3 to 10 mole, especially 3 to 8 mole, e.g. 3 to 5 mole, of phosphorus trichloride is used. Preferably the reaction is kept under reflux for 4 to 10 hours, especially 4 to 8 hours, e.g. 5 to 7 hours. Preferably, the excess phosphorus trichloride is distilled off. In the subsequent reaction of the crude product mixture with 2,4-di-tert-butyl-phenol in the presence of a tertiary amine or an aromatic amine and a solvent the temperature range is advantageously of from 10 to 100° C., especially from 10 to 80° C., e.g. from 20 to 80° C. The concentration of the reaction mixture is advantageously of from 10 to 80% by weight, especially from 10 to 60% by weight. The tertiary amine or the aromatic amine is used advantageously in a molar excess of from 10 to 100%, especially from 20 to 80%, e.g. from 30 to 70% based on the molar amount of 2,4-di-tert-butyl-phenol.

This improved Sandostab P-EPQ (RTM) is named in the further paragraphs LCT (Low-Chloride-Transparent) stabiliser mixture. This LCT stabiliser mixture is suitable for stabilising organic materials against oxidative, thermal or light-induced degradation.

The following Examples illustrate the invention further. Parts or percentages relate to weight.

EXAMPLE 1

Preparation of Crude Chlorobenzene Solution of Stabiliser Mixture (35% w/w)

In a 1.5 L jacketed glass reactor equipped with a mechanical stirrer and reflux condenser, a mixture of 90 g (0.584 mole) of biphenyl, 204 g (1.53 mole) of anhydrous aluminium chloride and 305 g (2.218 mole) of phosphorus trichloride was refluxed under a nitrogen atmosphere with stirring at an internal temperature of 75° C. for 6 hours, during which time hydrochloric acid gas was evolved and trapped with water in a scrubber tower. The reaction mixture was cooled and excess phosphorus trichloride was distilled off at an internal temperature of 63–65° C. and reduced pressure of 400–180 mbar. The crude melt was cooled to 35° C. and diluted with 220 g of chlorobenzene.

This crude solution was added to a stirred solution of 482 g (2.334 mole) of 2,4-di-tert-butyl-phenol, 362 g (4.576 mole) of pyridine and 600 g of chlorobenzene in a 2.5 L jacketed glass reactor equipped with a mechanical stirrer and reflux condenser with external water cooling. The reaction is exothermic and the internal temperature was kept below 80° C. At end of the addition, the mixture was kept 3 hours at an internal temperature of 63–65° C. On standing, the reaction mixture separated into two phases. The lower complex phase was separated and the upper organic phase was diluted with 430 g of chlorobenzene which lead to 1,650 g of crude chlorobenzene solution (35% w/w) comprising the stabiliser mixture. Acid base titration of this crude solution gives an average consumption of 0.125 mole of KOH/kg of solution.

This solution was used in the further examples for producing LCT stabiliser mixture.

EXAMPLE 2

Comparative Example 1000 g of crude chlorobenzene solution (35% w/w) of stabiliser mixture obtained according to Example 1, was cooled to −10° C. under stirring for 1 hour. The mixture was filtered from precipitated residual AlCl$_3$-pyridine complex. Gaseous ammonia (4.0 g) was bubbled through the filtrate at 0–5° C. and held at that temperature for 1 hour. An aliquot shaken with water showed a pH value of 8–9. The solvent was evaporated using a vacuum rotary evaporator at 100–110° C./350–310 mbar and finally at 170° C./<10 mbar. The residue yields 350 g of stabiliser mixture as a pale, yellowish turbid glassy solid (Tg=65° C.). The remaining chloride content is >5,000 mg/kg.

EXAMPLE 3

Preparation of LCT Stabiliser Mixture Containing a Low Amount of Chloride 1000 g of crude chlorobenzene solution (35% w/w) of stabiliser mixture obtained according to Example 1, was cooled to 5–10° C. under stirring. To this mixture was added 5.0 g (0.01 mole) of sodium tetraborate decahydrate (Na$_2$B$_4$O$_7$ 10 H$_2$O), 2.5 g (0.14 mole) of water and 5.0 g (0.04 mole) of sodium sulfate and stirred for one hour during which time the solution brightens up. Afterwards 8.0 g (0.11 mole) of powdered calcium hydroxide, 5.0 g (0.09 mole) of calcium oxide and 5.0 g of Kieselgur Clarcel DIF B (RTM) was added and stirred for 3 hours at 25° C. After filtration, the filtrate was evaporated using a vacuum rotary evaporator at 100–110° C./350–310 mbar and finally at 170° C./<10 mbar. The residue yields 350 g of LCT stabiliser mixture as a clear, light yellow solid (Tg=65° C.). The remaining chloride content is 1,000 mg/kg.

EXAMPLE 4

Preparation of LCT Stabiliser Mixture Containing a Low Amount of Chloride 1000 g of crude chlorobenzene solution (35% w/w) of stabiliser mixture obtained according to Example 1, was cooled to 20° C. under stirring. To this mixture was added 5.0 g (0.04 mole) of sodium sulfate followed by a neutraliser solution comprising 11.1 g (0.029 mole) of sodium tetraborate decahydrate (Na$_2$B$_4$O$_7$ 10 H$_2$O), 11.0 g (0.61 mole) of water and 3.0 g (0.075 mole) of sodium hydroxide. The mixture was stirred for one hour during which time the solution brightens up. Afterwards 2.0 g (0.027 mole) of powdered calcium hydroxide, 5.0 g (0.09 mole) of calcium oxide and 5.0 g of Kieselgur Clarcel DIF B (RTM) was added and stirred for 3 hours at 25° C. After filtration, the filtrate was evaporated using a vacuum rotary evaporator at 100–110° C./350–310 mbar and finally at 170° C./<10 mbar. The residue yields 350 g of LCT stabiliser mixture as a clear, light yellow solid (Tg=65° C.). The remaining chloride content is 400 mg/kg.

EXAMPLE 5

Preparation of LCT Stabiliser Mixture Containing a Low Amount of Chloride 1000 g of crude chlorobenzene solution (35% w/w) of stabiliser mixture obtained according to Example 1, was cooled to 20° C. under stirring. To this mixture was added 5.0 g (0.04 mole) of sodium sulfate followed by 10.0 g (0.026 mole) of sodium tetraborate decahydrate (Na$_2$B$_4$O$_7$ 10 H$_2$O). The mixture was stirred for one hour during which time the solution brightens up. Afterwards a neutraliser solution comprising 6.6 g (0.017 mole) of sodium tetraborate decahydrate (Na$_2$B$_4$O$_7$ 10 H$_2$O), 1.8 g (0.045 mole) of sodium hydroxide and 6.6 g (0.37 mole) of water was added. The mixture was stirred for 30 minutes at room temperature. Afterwards 2.0 g (0.027 mole) calcium hydroxide, 6.0 g (0.107 mole) of calcium oxide and 5.0 g of Kieselgur Clarcel DIF B (RTM) was added and stirred for 3 hours at 25° C. After filtration, the filtrate was evaporated using a vacuum rotary evaporator at 100–110° C./350–310 mbar and finally at 170° C./<10 mbar. The residue yields 350 g of LCT stabiliser mixture as a clear, light yellow solid (Tg=65° C.). The remaining chloride content is 300 mg/kg.

EXAMPLE 6

Preparation of LCT Stabiliser Mixture Containing a Low Amount of Chloride 1000 g of crude chlorobenzene solution (35% w/w) of stabiliser mixture obtained according to Example 1, was cooled to 20° C. under stirring. To this mixture was added 5.0 g (0.04 mole) of sodium sulfate followed by 17.0 g (0.044 mole) of sodium tetraborate decahydrate (Na$_2$B$_4$O$_7$ 10 H$_2$O). The mixture was stirred for one hour during which time the solution brightens up. Afterwards 5.0 g (0.068 mole) calcium hydroxide and 5.0 g (0.089 mole) of calcium oxide was added and stirred for one hour. Then 5.0 g of Kieselgur Clarcel DIF B (RTM) was added and stirred for 3 hours at 25° C. After filtration, the filtrate was evaporated using a vacuum rotary evaporator at 100–110° C./350–310 mbar and finally at 170° C./<10 mbar. The residue yields 350 g of LCT stabiliser mixture as a clear, light yellow solid (Tg=65° C.). The remaining chloride content is 200 mg/kg.

EXAMPLE 7

Preparation of LCT Stabiliser Mixture Containing a Low Amount of Chloride 1000 g of crude chlorobenzene solution (35% w/w) of stabiliser mixture obtained according to Example 1, was cooled to 20° C. under stirring. To this mixture was added 5.0 g (0.047 mole) of sodium carbonate followed by 10.0 g (0.026 mole) of sodium tetraborate decahydrate ($Na_2B_4O_7$ 10 $H_2O$). The mixture was stirred for one hour during which time the solution brightens up. Afterwards a neutraliser solution comprising 9.9 g (0.026 mole) of sodium tetraborate decahydrate ($Na_2B_4O_7$ 10 $H_2O$), 1.8 g (0.068 mole) of sodium hydroxide and 9.9 g (0.55 mole) of water was added. The mixture was stirred for 30 minutes at room temperature. Afterwards 2.0 g (0.027 mole) calcium hydroxide, 5.0 g (0.089 mole) of calcium oxide and 5.0 g of Kieselgur Clarcel DIF B (RTM) was added and stirred for 3 hours at 25° C. After filtration, the filtrate was evaporated using a vacuum rotary evaporator at 100–110° C./350–310 mbar and finally at 170° C./<10 mbar. The residue yields 350 g of LCT stabiliser mixture as a clear, light yellow solid (Tg is 65° C.). The remaining chloride content is 400 mg/kg.

EXAMPLE 8
Preparation of LCT Stabiliser Mixture Containing a Low Amount of Chloride 1000 g of crude chlorobenzene solution (35% w/w) of stabiliser mixture obtained according to Example 1, was cooled to 20° C. under stirring. To this mixture was added 5.0 g (0.035 mole) of sodium sulfate followed by 5.0 g (0.013 mole) of sodium tetraborate decahydrate ($Na_2B_4O_7$ 10 $H_2O$) and 2.5 g (0.139 mole) of water. The mixture was stirred for one hour during which time the solution brightens up. Afterwards a suspension comprising 8.7 g (0.155 mole) of calcium oxide and 2.7 g (0.009 mole) of sodium carbonate decahydrate in 94 g of chlorobenzene was added. Finally, 5.0 g of Kieselgur Clarcel DIF B (RTM) was added and stirred for 2 hours at 25° C. After filtration, the filtrate was evaporated using a vacuum rotary evaporator at 100–110° C./350–310 mbar and finally at 170° C./<10 mbar. The residue yields 350 g of LCT stabiliser mixture as a clear, light yellow solid (Tg is 65° C.). The remaining chloride content is 1200 mg/kg.

EXAMPLE 9
Preparation of LCT Stabiliser Mixture Containing a Low Amount of Chloride 1000 g of crude chlorobenzene solution (35% w/w) of stabiliser mixture obtained according to Example 1, was cooled to 20° C. under stirring. To this mixture was added 5.0 g (0.013 mole) of sodium tetraborate decahydrate ($Na_2B_4O_7$ 10 $H_2O$), 10.0 g (0.10 mole) of calcium carbonate powder, 5.0 g (0.035 mole) of sodium sulfate followed by 2.5 g (0.139 mole) of water. The mixture was stirred for one hour during which time the solution brightens up. Afterwards 5.0 g (0.089 mole) of calcium oxide was added and the mixture was stirred for one hour at room temperature. Finally, 5.0 g of Kieselgur Clarcel DIF B (RTM) was added and stirred for 2 hours at 25° C. After filtration, the filtrate was evaporated using a vacuum rotary evaporator at 100–110° C./350–310 mbar and finally at 170° C./<10 mbar. The residue yields 350 g of LCT stabiliser mixture as a clear, light yellow solid (Tg is 65° C.). The remaining chloride content is 2100 mg/kg.

EXAMPLE 10
Preparation of LCT Stabiliser Mixture Containing a Low Amount of Chloride 1000 g of crude chlorobenzene solution (35% w/w) of stabiliser mixture obtained according to Example 1, was cooled to 15° C. under stirring. To this mixture was added 10.0 g (0.026 mole) of sodium tetraborate decahydrate ($Na_2B_4O_7$ 10 $H_2O$) and 4.0 g (0.222 mole) of water. The mixture was stirred for two hours during which time the solution brightens up. Afterwards 10.1 g (0.095 mole) of powdered anhydrous sodium carbonate was added and stirred for one hour. Then 5.0 g (0.089 mole) calcium oxide was added and stirred for one hour. Finally, 5.0 g of Kieselgur Clarcel DIF B (RTM) was added and stirred for 2 hours at 25° C. After filtration, the filtrate was evaporated using a vacuum rotary evaporator at 100–110° C./350–310 mbar and finally at 170° C./<10 mbar. The residue yields 350 g of LCT stabiliser mixture as a clear, light yellow solid (Tg is 65° C.). The remaining chloride content is 250 mg/kg.

What is claimed is:
1. A process for the preparation of a stabiliser mixture containing a low amount of chloride comprising a) 50–80% by weight of a diphosphonite of the formula I

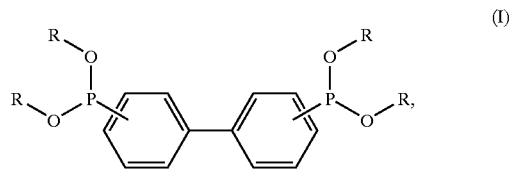

b) 5–25% by weight of a monophosphonite of the formula II

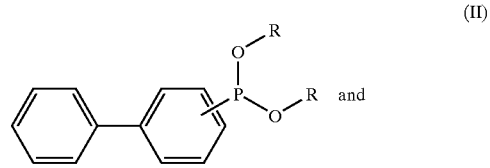

c) 5–25% by weight of a phosphite of the formula III

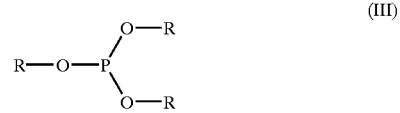

in which R is a radical of the formula IV

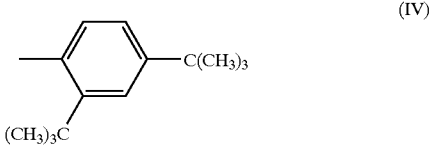

and where the sum of the compounds of the formula I, II and III is not greater than 100% by weight, by reacting a biphenyl of the formula V

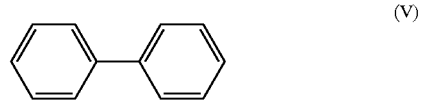

under Friedel-Crafts condition with phosphorus trichloride and aluminium trichloride and by reacting the product mixture with 2,4-di-tert-butyl-phenol of the formula VI

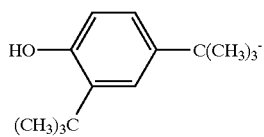
(VI)

in the presence of a tertiary amine or an aromatic amine and a solvent, separating the formed two layers, which process comprises treating the solvent layer with water, a base and a desiccant, separating the precipitate from the solution containing the stabiliser mixture and evaporating the solvent.

2. A process according to claim 1, wherein, the tertiary amine is a compound of the formula VII

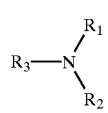
(VII)

wherein $R_1$, $R_2$ and $R_3$ are the same or different, and are $C_1$–$C_{24}$alkyl; $C_4$–$C_{24}$alkyl interrupted by one or more O-atoms; phenyl, $C_7$–$C_9$phenylalkyl; $C_7$–$C_9$alkylphenyl; or two of $R_1$, $R_2$ and $R_3$ together with the N-atom to which they are attached form a 5-, 6- or 7-membered heterocyclic ring, which optionally contains further oxygen, nitrogen or sulphur atom and which is unsubstituted or substituted by one or more $C_1$–$C_4$alkyl groups, and the other of $R_1$, $R_2$ and $R_3$ is $C_1$–$C_{24}$alkyl or $C_4$–$C_{24}$alkyl interrupted by one or more O-atoms.

3. A process according to claim 1, wherein the aromatic amine is pyridine which is unsubstituted or substituted by one or more $C_1$–$C_4$alkyl groups.

4. A process according to claim 1, wherein, the solvent is benzene which is unsubstituted or substituted by one or more chlorine or $C_1$–$C_4$alkyl groups.

5. A process according to claim 1, wherein the base is an alkaline metal- or an alkaline earth metal-hydroxide, oxide, hydrogen phosphate, dihydrogen phosphate, carbonate, hydrogen carbonate or tetraborate.

6. A process according to claim 1, wherein the desiccant is an alkaline metal sulfate, an alkaline earth metal sulfate or oxide, a molecular sieve or aluminium oxide.

7. A process according to claim 1, which comprises treating the solvent layer additionally with a filter-aid before separating the precipitate from the solution containing the stabiliser mixture.

8. A process according to claim 7, wherein the filter-aid is fuller's earth or infusorial earth.

9. A process according to claim 1, which comprises treating the solvent layer with water, a base and a desiccant at a temperature range of 0–25° C.

10. A process according to claim 1, which comprises treating the solvent layer with water in an amount of from 0.1 to 10% by weight based on the weight of the solvent layer.

* * * * *